United States Patent
Anderson

(10) Patent No.: US 7,436,404 B2
(45) Date of Patent: *Oct. 14, 2008

(54) METHOD AND APPARATUS FOR RENDERING OF TRANSLUCENT OBJECTS USING VOLUMETRIC GRIDS

(75) Inventor: John R. Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 406 days.

This patent is subject to a terminal disclaimer.

(21) Appl. No.: 11/317,626

(22) Filed: Dec. 22, 2005

(65) Prior Publication Data

US 2006/0250396 A1    Nov. 9, 2006

Related U.S. Application Data

(63) Continuation of application No. 10/428,322, filed on Apr. 30, 2003, now Pat. No. 7,019,744.

(51) Int. Cl.
*G06T 15/50* (2006.01)
*G06T 15/00* (2006.01)
*G06T 17/00* (2006.01)

(52) U.S. Cl. .......... 345/426; 345/419; 345/424
(58) Field of Classification Search ........ 345/424, 345/426
See application file for complete search history.

(56) References Cited

U.S. PATENT DOCUMENTS

| | | |
|---|---|---|
| 5,649,032 A | 7/1997 | Burt et al. |
| 5,936,629 A | 8/1999 | Brown et al. |
| 6,064,393 A | 5/2000 | Lengyel et al. |
| 6,226,005 B1 | 5/2001 | La Ferriere |
| 6,266,053 B1 | 7/2001 | French et al. |
| 6,278,466 B1 | 8/2001 | Chen |
| 6,313,846 B1 * | 11/2001 | Fenney et al. ............ 345/552 |
| 6,330,000 B1 * | 12/2001 | Fenney et al. ............ 345/586 |
| 6,456,405 B2 | 9/2002 | Horikoshi et al. |
| 6,573,898 B1 | 6/2003 | Mathur et al. |
| 6,624,812 B1 | 9/2003 | Collodi |
| 6,707,452 B1 | 3/2004 | Veach |
| 6,744,435 B2 | 6/2004 | Zwicker et al. |
| 7,019,744 B2 * | 3/2006 | Anderson ............ 345/424 |
| 7,098,910 B2 * | 8/2006 | Petrovic et al. ........ 345/420 |
| 7,129,940 B2 * | 10/2006 | Cook et al. ............ 345/418 |

(Continued)

OTHER PUBLICATIONS

Cook et al., "The Reyes Image Rendering Architecture," *Computer Graphics*, vol. 21, No. 4, 1987, pp. 95-102.

(Continued)

*Primary Examiner*—Ulka Chauhan
*Assistant Examiner*—Roberta Prendergast
(74) *Attorney, Agent, or Firm*—Townsend & Townsend & Crew LLP

(57) ABSTRACT

A method for rendering an object includes determining illumination values for surface points on the object, associating a grid including vertices and voxels with the object, determining illumination values associated with vertices from illumination values for surface points on the object, performing one or more low pass filters on the illumination values associated with the vertices to form compensation values associated with the vertices, and determining compensated illumination values for the surface points by combining the illumination values for the surface points and the compensation values associated with the vertices.

25 Claims, 7 Drawing Sheets

U.S. PATENT DOCUMENTS

| | | | |
|---|---|---|---|
| 7,176,918 B2* | 2/2007 | Anderson et al. | 345/426 |
| 7,184,043 B2* | 2/2007 | Anderson et al. | 345/426 |
| 2004/0125103 A1 | 7/2004 | Kaufman et al. | |
| 2004/0217957 A1* | 11/2004 | Anderson | 345/426 |
| 2004/0217961 A1* | 11/2004 | Cook et al. | 345/502 |
| 2004/0227757 A1* | 11/2004 | Petrovic et al. | 345/426 |
| 2004/0263511 A1* | 12/2004 | West et al. | 345/421 |
| 2005/0253842 A1* | 11/2005 | Petrovic et al. | 345/419 |
| 2006/0274065 A1* | 12/2006 | Buyanovskiy | 345/424 |

OTHER PUBLICATIONS

Drebin et al., "Volume Rendering," *ACM Computer Graphics*, vol. 22, No. 4, 1988, pp. 65-74.

Jensen et al., "A Practical Model for Subsurface Light Transport," (Stanford University), *Proceedings of SIGGRAPH'2001*, 8 pages total.

Jensen et al., "A Practical Model for Subsurface Light Transport," [Online] Retrieved from the Internet: http://graphics.ucsd.edu/!henrik/papers/bssrdf/, printed Mar. 6, 2003, pp. 1-2.

Jensen, "A Rapid Hierarchical Rendering Technique for Translucent Materials, Hierarchical BSSRDF Evaluation," [Online] Retrieved from the Internet: <<http://graphics.ucsd.edu/~henrik/papers/fast_bssrdf/>>, printed Mar. 6, 2003, pp. 1-2.

Jensen, A Rapid Hierarchical Rendering Technique for Translucent Materials. *Proceedings of SIGGRAPH'2002*, 6 pages total.

Jensen, "Images with Subsurface Scattering," [Online] Retrieved from the Internet: http://graphics.ucsd.edu/~henrik/images/subsurf.html, printed Mar. 6, 2003, pp. 1-2.

Jensen, "Rendering Translucent Materials—Beyond the BRDF," [Online] Retrieved from the Internet: <<http://graphics.ucsd.edu/!henrik/papers/ET2001/, printed Mar. 6, 2003>>, p. 1.

McNamara, "Illumination in Computer Graphics," The University of Dublin, Jan. 13, 2003, [Online] Retrieved from the Internet: <<http://www.cs.tcd.ie/courses.baict.bass/4ict10/Hillary2003/Lecture3_13Jan.pdf>> 23 pages.

Miesch et al., "Monte Carlo Approach for Solving The Radiative Transfer Equation Over Mountainous and Heterogeneous Areas", *Applied Optics*, Dec. 20, 1999, vol. 38, No. 36, pp. 7419-7430.

Owen, "Ray Tracing," Jul. 20, 1999, Retrieved from the Internet: <<http://www.siggraph.org/education.materials/HyperGraph/raytrace/rtrace0.htm>> 1 page only.

Pharr et al., "Monte Carlo Evaluation of Non-Linear Scattering Equations for Subsurface Reflection", (Stanford University), *Proceedings of SIGGRAPH 2000*, 10 pages total.

Stam, "Multiple Scattering as a Diffusion Process," Department of Computer Science, University of Toronto, Toronto, Canada.

* cited by examiner

METHOD AND APPARATUS FOR RENDERING OF TRANSLUCENT OBJECTS USING VOLUMETRIC GRIDS

CROSS-REFERENCES TO RELATED APPLICATIONS

The present invention is related to and incorporates by reference for all purposes the following co-pending patent application, application Ser. No. 10/428,321 titled: Shot Rendering Method and Apparatus, filed Apr. 30, 2003.

BACKGROUND OF THE INVENTION

The present invention relates to computer animation. More particularly, the present invention relates to techniques and apparatus for efficient rendering of objects that are specified to include translucent materials.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer aided animation (CA) industry was Pixar. Pixar developed both computing platforms specially designed for computer animation and animation software now known as RenderMan®. RenderMan® was particularly well-received in the animation industry and recognized with two Academy Awards®.

RenderMan® software is used to convert graphical specifications of objects and convert them into one or more images. This technique is known in the industry as rendering. One specific portion of the rendering process is known as surface shading. In the surface shading process the software determines how much light is directed towards the viewer from the surface of objects in an image in response to the applied light sources.

For different types of object materials, however, the amount of light directed towards the viewer is more than the light reflected from the surface. Such types of materials include materials that are at least partially translucent in nature, such as plastic, skin, milk, and the like. Translucent materials may also include materials that are non-uniformly translucent, such as marble, jade, and the like, and may have sub-surface features. Compensation for subsurface scattering and other effects of translucency are deemed important for the realism of computer-generated imagery.

Techniques to compensate and to render translucent objects have previously been proposed and generally fall into two categories: surface based approaches, and stochastic ray tracing methods. Each of these approaches has significant shortcomings. Surface based approaches suffer from technical difficulties in the parametric representation of sample locations. Additionally, such approaches do not address the fundamental problem of representing an internal structure of the scattering media.

Stochastic ray tracing approaches can be used to solve the full physical problem, however such approaches are generally very time consuming. Another approach includes a finite element analysis through a hierarchical evaluation of a radiative transfer equation. Again such approaches are very computationally intensive. Because the present solutions to the problem of rendering objects of translucent materials is slow, animators using such rendering techniques cannot quickly see how the animation will look. Accordingly, the animators must often wait overnight to see the rendering results.

In light of the above, what is needed are efficient techniques to render translucent objects.

BRIEF SUMMARY OF THE INVENTION

The present invention relates to the field of computer animation. More particularly, the present invention relates to techniques and apparatus for efficient rendering of objects composed of translucent materials.

The techniques described below are based on an explicit representation of the subsurface illumination fluxes on a 3 dimensional grid. This representation allows the efficient spatial indexing of illumination samples from the unstructured geometry of the object. This representation allows the rendering engine to quickly solve the transport of diffuse illumination inside the translucent material with full representation of the internal structure.

The process described below includes the following phases: 1) evaluation of surface illumination on object, collection of surface illumination, determining of area weighting, and scattering properties on sample grids; 2) efficient determination of the diffuse radiative transfer on the sample grids; and 3) sampling the diffuse illumination during final rendering pass.

In this embodiment, the first phase is the illumination sampling pass. In this phase, the relevant light sources are evaluated on the surface of an object and the surface shading model is evaluated to determine the quantity of diffuse illumination for each color channel. The diffuse illumination at the surface are transmitted to the translucency solver, described below. Additionally, Cartesian solver grids are constructed which cover the bounding volume of the object sample points. The diffuse illumination values are inserted onto the solver grids where they are merged with other values. The merge process is accomplished by adding the representative sample area for the sample into one grid and simultaneously adding the product of the sample area and the illumination value are added into a second grid. Scattering properties such as attenuation and scattering length are also mapped onto grid structures using the same technique. For internal structures with varying scattering properties additional samples of these properties are added. During this phase the samples may be offset from the actual sample position using the surface normal to simulate the effects of an initial forward scattering process before the illumination enters the diffuse solver.

The second phase of the process is the solution of the scattering pass itself. In this embodiment, the illumination and scattering properties are normalized by processing all of the grids with a short range dealiasing filter and diving the area weighted illumination and scattering property grids by the area grid value. The diffuse illumination values are then solved by solving the elliptic radiative transfer equation (1) on the grid values. This process can be done efficiently in several ways. For example, in one approach the process is performed via a recursive low pass filter whose filter coefficients vary with scattering parameters across the grid in each direction for each dimension. The filter parameters are chosen so that the bidirectional filter impulse response approximates the Green's function of the scattering operator with the local scattering parameters. In another approach, the variable coefficient elliptic scattering equation is solved using a fast elliptic solver such as a fast convolution FFT solver or multi-grid solver.

The third phase of the process is to take the completed grid containing the solved diffuse illumination and point sample the grid using an interpolation kernel from the surface shaders. This may occur during a final rendering pass for the surface. All of the sample processing for this phase is done in global 3-space so that no surface coordinate parameterizations are needed and smoothness across multiple geometry elements is provided.

According to one aspect of the invention, a method for rendering an object is described. One technique includes performing shading calculations to determine diffuse illumination values for a plurality of surface points on the object, and associating a three-dimensional grid with the object, wherein the three-dimensional grid includes a plurality of vertices, wherein the plurality of vertices define a plurality of voxels, and wherein each voxel includes at least a portion of the object. A process may also include determining diffuse illumination values for at least a subset of vertices in response to the diffuse illumination values for the plurality of surface points on the object, wherein the subset of vertices is associated with a subset of voxels, and wherein each voxel in the subset of voxels includes one or more diffuse illumination values for one or more surface points on the object. Next, one process may include performing one or more low pass filter operations on the diffuse illumination values for the subset of vertices to determine diffuse illumination compensation values for vertices in the subset of vertices, and determining compensated diffuse illumination values for the plurality of surface points on the object in response to the diffuse illumination values for the plurality of surface points and in response to the diffuse illumination compensation values for the vertices in the subset of vertices.

According to another aspect of the invention, a computer program product for a computer system including a processor is described. The computer program product may include computer code that directs the processor to perform shading calculations to determine diffuse illumination values for a plurality of surface points on the object, computer code that directs the processor to associate a three-dimensional grid with the object, and wherein the three-dimensional grid comprises a plurality of vertices and a plurality of voxels, and computer code that directs the processor to determine surface voxels from the plurality of voxels, wherein each of the surface voxels is associated with at least a surface portion of the object, and wherein each of the surface voxels is associated with diffuse illumination values for one or more surface points on the object. The computer program product may also include computer code that directs the processor to determine diffuse illumination values for at least a subset of vertices in response to the diffuse illumination values for surface points on the object associated with the surface voxels, wherein the subset of vertices is associated with the surface voxels, computer code that directs the processor to determine diffuse illumination compensation values for the subset of vertices in response to the diffuse illumination values for the subset of vertices, and computer code that directs the processor to determine compensated diffuse illumination values for a subset of surface points of the plurality of surface points on the object in response to diffuse illumination values for the subset of surface points and in response to diffuse illumination compensation values for the subset of vertices. The codes may be executable or human-readable code. These codes may reside on a tangible media such as a hard disk drive, network storage, removable media, or the like.

According to yet another aspect of the invention, a computing system includes a memory configured to store a geometric description of an object to be rendered, and a processor coupled to the memory. The processor may be configured to performing surface shading calculations to determine illumination values for a plurality of surface points on the object, configured to associate a three-dimensional grid with the object, wherein the three-dimensional grid includes a plurality of vertices, and wherein the plurality of vertices define a plurality of voxels, and configured to determine illumination values for a subset of voxels in response to the illumination values for the plurality of surface points on the object. The processor may also be configured to determine illumination values for a subset of vertices in response to the illumination values for the subset of voxels, configured to determine scattering values for the plurality of voxels in response to scattering values associated with the object, and configured to determine scattering values for the plurality of vertices in response to the scattering values for the plurality of voxels. Still further, the processor is configured to perform one or more low pass filter operations in response to the illumination values for the subset of vertices and in response to the scattering values for the plurality of vertices to determine illumination compensation values for the subset of vertices, and configured to determine compensated illumination values for the plurality of surface points in response to the illumination values for the plurality of surface points and in response to the illumination compensation values for the subset of vertices.

BRIEF DESCRIPTION OF THE DRAWINGS

In order to more filly understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
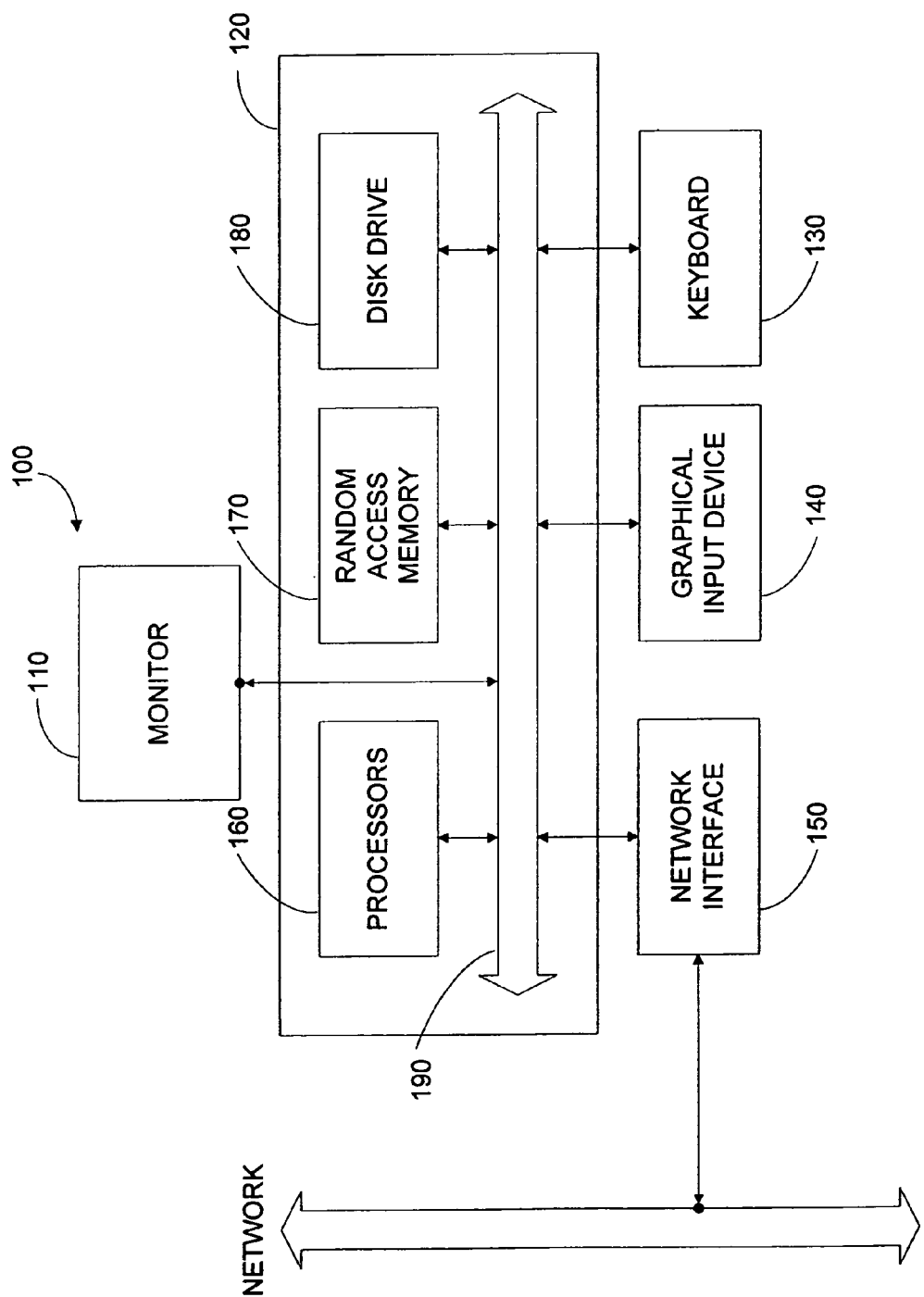
FIG. 1 illustrates a block diagram of a rendering system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, displacement maps, scattering lengths and absorption data of object materials, and the like. Other types of tangible media include floppy disks, removable hard disks, optical storage media such as CD-ROMS, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2A:
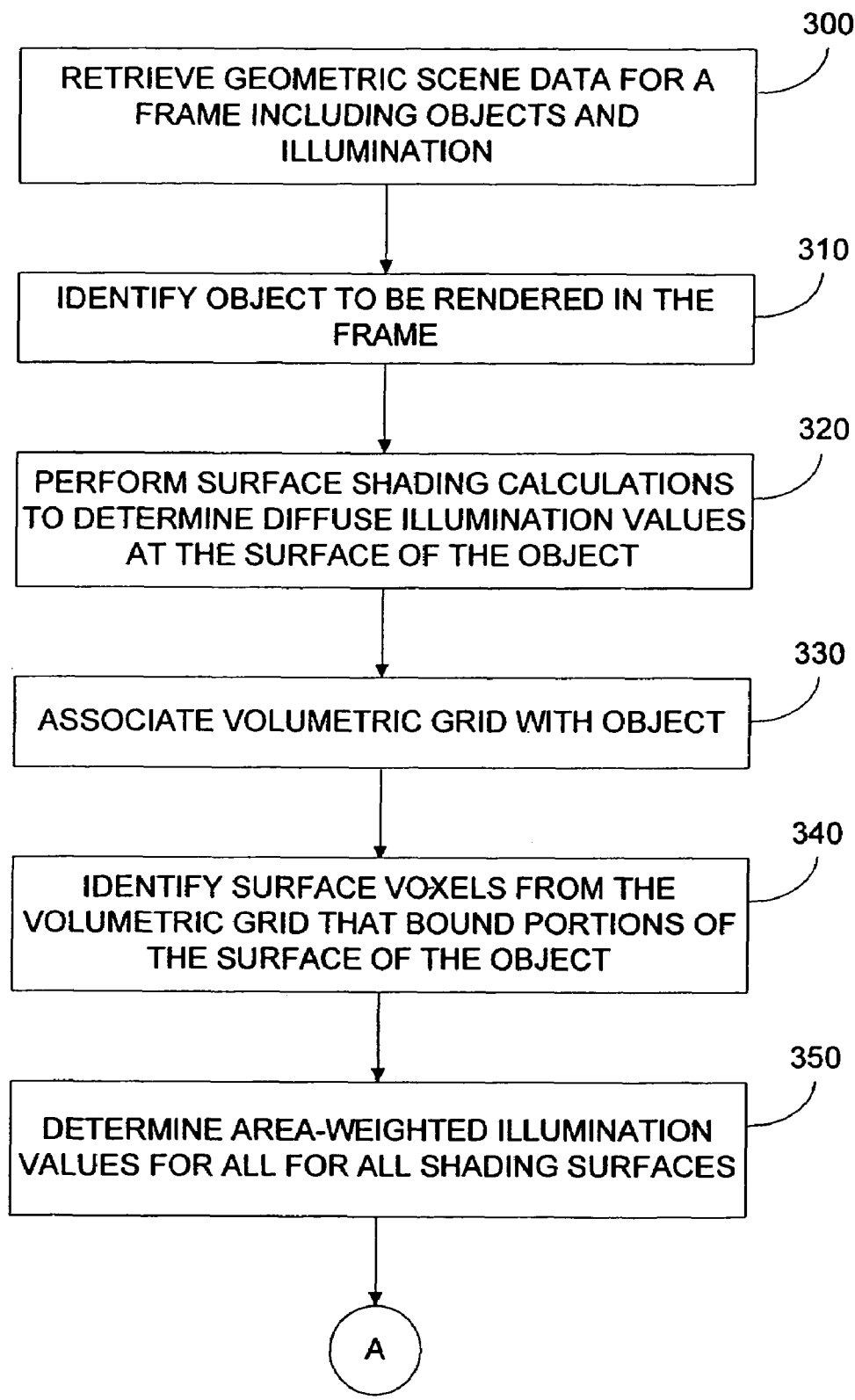
FIGS. 2A-c illustrate a block diagram of a flow process according to an embodiment of the present invention.
Figure 2B:
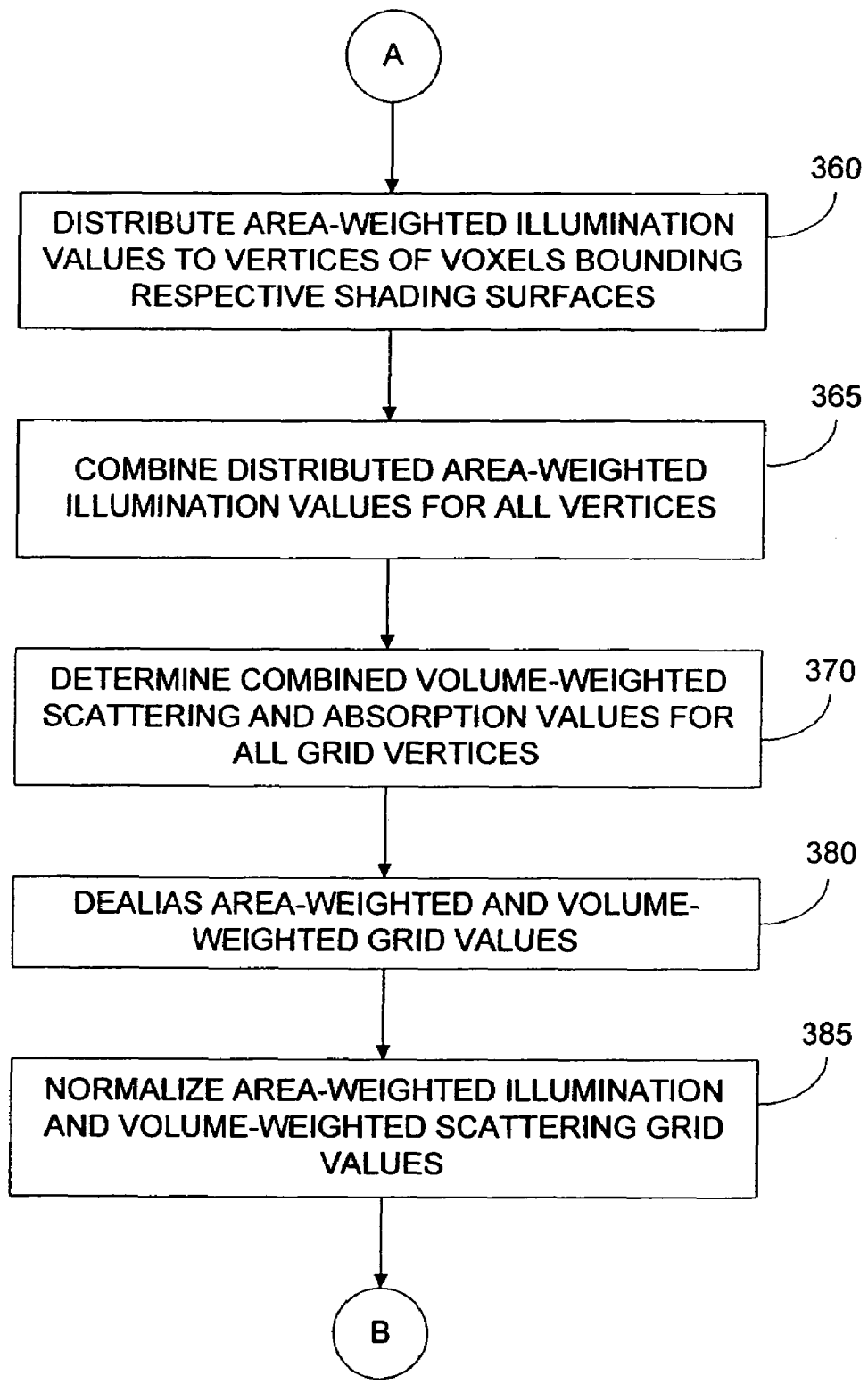
Figure 2C:
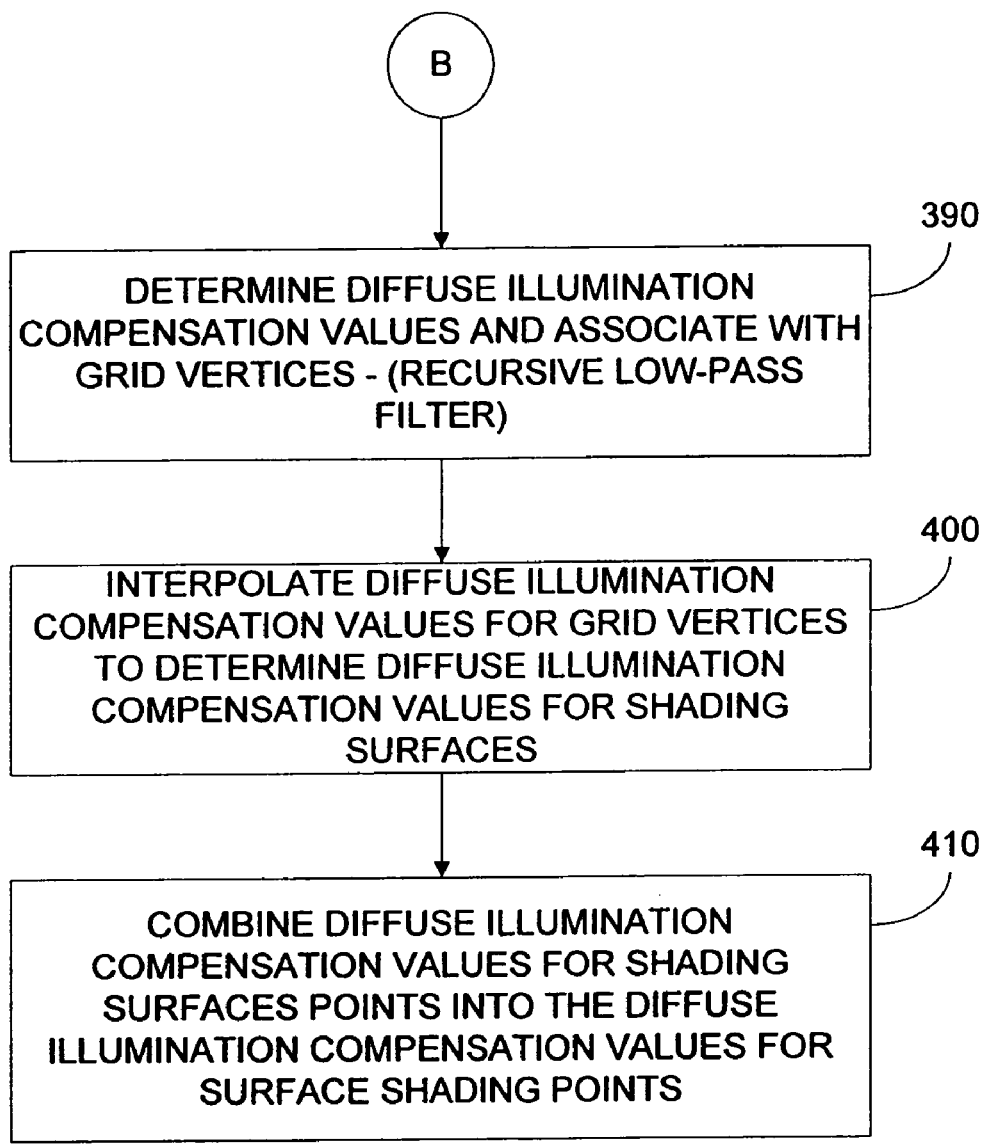

FIGS. 2A-C illustrates a block diagram of a flow process according to an embodiment of the present invention. More particularly, the block diagram discloses a process in which the material property of an object are considered as part of the shading process In one embodiment of the present invention, the process begins with the specification of an image to be rendered, step 300. In this example, image specification includes the specification of one or more scene backgrounds, the specifications of objects and textures in the images, the specification of lighting to be applied to the images, the specification of object placement data, the specification of animation parameters for objects in the scene, displacement maps, and the like. Typically, images are specified by one ore more animators using conventional three-dimensional modeling techniques and software currently available. For example, software such as Alias|Wavefront's Maya ™Software and the like may be used to specify the scene.

In the present examples, a specification of a background typically includes a geometric specification of a location or a "set" into which objects, described below, are placed. The geometric specification may include geometric boundaries, one or more "environment" maps, and the like. These environment maps may be static or may vary with time. In examples of the present invention, a set may represent any location where the objects are placed, such as a room, an interior location, an exterior location, or the like.

The objects are placed or positioned by the animator into the set. These objects may be in inanimate objects within a scene such as furniture, plants, vehicles, and the like. Additionally, these objects may be objects that move or are moved within the scene, for example, characters, chairs, doors, and the like. In the present embodiment, objects may be simple to complex, with some objects being formed from one or more smaller objects. In some embodiments, only portions of objects may be retrieved from a memory, and the remaining portions of the objects are dynamically created before being rendered. As merely an example, the character Sullivan™ in the movie Monsters, Inc.™ includes over three million hairs objects, however, only about one million hair objects are stored in memory with the remaining two million hair objects generated on the fly. In such cases, the dynamically created objects are termed procedurally generated objects.

In the present embodiment, objects are typically stored separately from each other. That is, each object may be stored in its own file and be retrieved by a computer file system. In other embodiments of the present invention, data for more than one object may be included into a single file.

Each scene typically also includes a specification of light sources and lighting parameters. Lighting data may include light sources, light types (e.g. diffuse, point), lighting locations, lighting directions, and the like. This lighting data may be stored within a single file or multiple files.

Next, an object to be rendered is identified, retrieved from disk memory and then stored in program memory, step 310. In one embodiment, streaming technology is used so that the rendering engine can begin processing the object, although the entire data file has not yet been completely retrieved by memory. In other embodiments, the rendering engine begins processing the object after it is retrieved from memory.

In the present embodiment, once the object is retrieved from disk memory, the surface of the object is shaded, step 320. Any number of conventional surface shading programs may used for this step, for example, RenderMan® software may be used to determining the surface shading for each light source. In one embodiment, the shading of the surface is determined for all lighting sources at the same time. In an alternative embodiment, the surface of the object is shaded individually for each light source. For example, if there are two light sources, there may be two separate shading values for each location on the surface of the object.

In this embodiment, a volumetric grid is then constructed to bound the entire object, step 330. In one example, the volumetric grid is Cartesian grid with approximately 200 to 500 vertices per side; accordingly the Cartesian grid may include from 8 million to 125 million voxels. The number of grid locations per side may be unequal and may vary, for example, a grid may be constructed to have 110 voxels in an x direction, 400 in a y direction and 500 in a z direction; thus the grid may include approximately 22 million voxels. In light of the present patent application, one of ordinary skill in the art would understand that the resolution of the volumetric grid in any direction and total number of voxels defined will vary according to specific engineering requirements and resources. In one embodiment, the voxels may be cubes, however in other embodiments, the voxels may have unequal dimensions and be irregular in shape.

In the present example, not all voxels will include a portion of the object or the surface of the object. For this embodiment, such voxels are ignored for the following, calculations or discarded.

Next, the voxels that bound any portion of the surface of the object (surface voxels) are identified, step 340.

In the present embodiment, the vertices of each surface voxel that includes a surface portion of the object are associated with diffuse illumination values. The surface portions typically include shading surfaces (e.g. triangles) defined by shading values (diffuse illumination values) and associated shading areas. In this embodiment, the shading values typically include red, green, blue (RGB) shading components; and the shading areas typically represent an area of a respective shading surface.

In this embodiment, the size of shading areas are smaller than the grid spacing, accordingly, an area weighting operation is performed for each shading value, step 350.

Next, the area weighting values for each shading value are distributed to each of the 8 vertices in a voxel, step 360. In this embodiment, after each of the area-weighted shading values are distributed to the vertices, the contributions are added-up, step 365. In one embodiment, a typical vertex is associated with contributions of shading surfaces from different voxels.

Figure 3A:
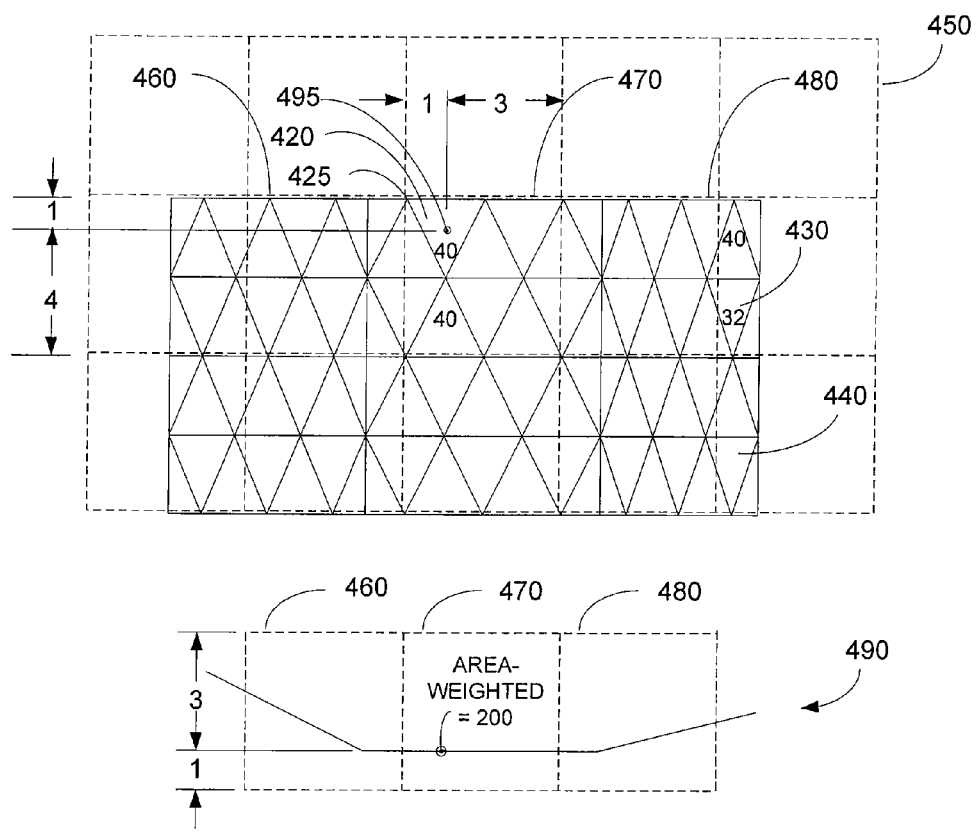
FIGS. 3A-B illustrate an example of an embodiment of the present invention.
Figure 3B:
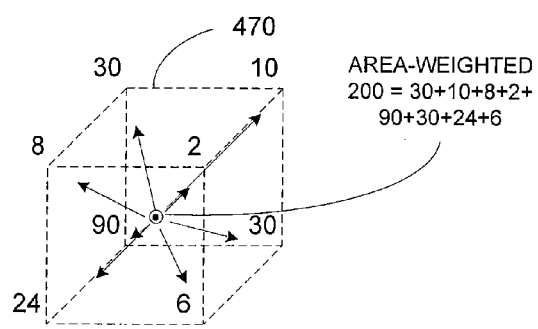

FIGS. 3A and 3B illustrate an example of one embodiment of the present invention. FIG. 3A illustrates a top view and a profile view of one example. In FIG. 3A a number of diffuse illumination values 430 and shading surfaces 440 (including shading surface 420) are illustrated with solid lines. On top of these values are voxel boundaries 450 illustrated with dotted lines (slightly offset up and to the left for clarity). In this embodiment, shading surfaces 440 are triangles, although in other embodiments, the shading surfaces may be triangles of different geometry and area, or different shapes (e.g. quadrilateral).

In this example, voxels 460, 470 and 480 are illustrated from the top and from the side in profile view in 490. In this example, the diffuse illumination value of shading surface 420 is assumed to be at the centroid 495 of shading surface 420. Further, as can be seen, centroid is location within voxel 470 ¼ the way from the closest corner 425, ⅕ the way in another direction, and ¼ in the third direction. Further, in this example, the diffuse illumination value is determined to be 40, and the surface area for shading surface 420 is 5 units.

In this example the area-weighted illumination value is (40×5=200) 200. The area-weighted illumination is then divided in a three to 1 ratio to the bottom corners. Thus the bottom corners divide 150 and the top corners divide 50. Next, based upon the position of centroid 495, these illumination values are further divided in approximately the way illustrated in FIG. 3B.

Figure 4A:
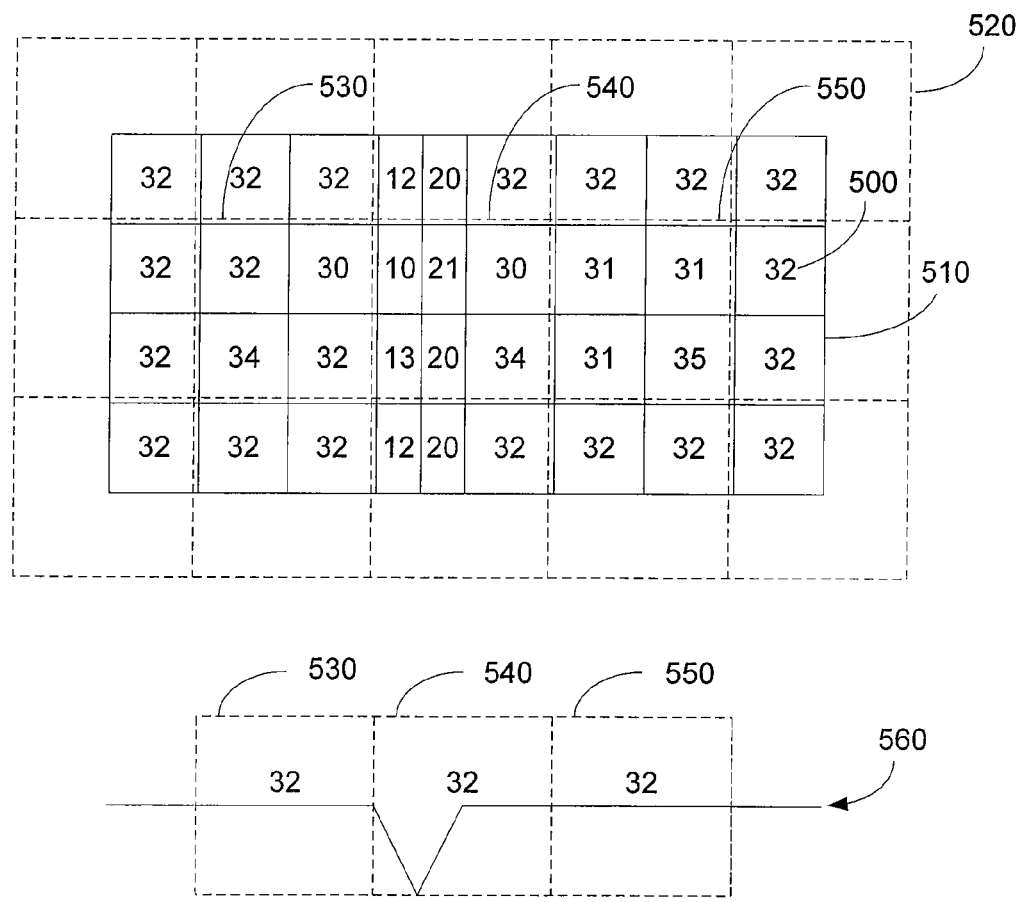
FIGS. 4A-B illustrate an example of an embodiment of the present invention.
Figure 4B:
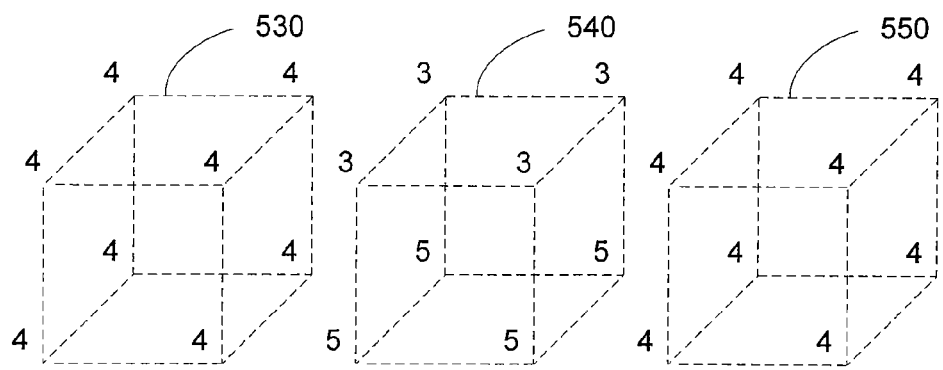

In other embodiments of the present invention, any other conventional method for distributing shading values to vertices of voxels is contemplated. For example, the area-weighted contribution for all shading surfaces may be determined once for the voxel, and that value is distributed to the eight vertices in the voxel, depending upon position. FIGS. 4A and 4B illustrates such an example.

FIG. 4A illustrates a top view and a profile view of one example. In FIG. 4A, a number of diffuse illumination values 500 and shading surfaces 510 are illustrated with solid lines. On top of these values are voxel boundaries 520 illustrated with dotted lines (slightly offset up and to the left for clarity). In this embodiment, shading surfaces 510 are squares of equal area, although in other embodiments, the shading surfaces may be quadrilaterals of different area.

In this example, voxels 530, 540 and 550 are illustrated including the shading surfaces and shading values shown. Also illustrated is a profile view 560 illustrating a location of the shading surfaces within voxels 530, 540, and 550. In this example, using area weighting calculations, the average illumination value in voxel 530 is illustrated as 32; the average illumination value in voxel 540 is 32, and the average illumination value in voxel 550 is 32. From the top view, the average illumination values are associated with the centers of the respective voxels, i.e. from the top, the average illumination values are assumed to be equidistant to the four respective corners of the voxels. From profile view 560, the average illumination values for voxels 530 and 550 associated with the center of the voxels, and are equidistant from the top and bottom corners, but the average illumination values for voxel 540 is associated with a position about 1.7 times closer to the bottom corners than the top corners.

As illustrated in FIG. 4B, the average diffuse illumination values are distributed to the respective vertices in voxels 530, 540, and 550 based upon the positions of the average illumination values, determined above. For voxels 530 and 550, the distribution to the top and bottom vertices is uniform. However, in this example, for voxel 540, because the illumination values are on the average, about 1.7 times closer to the bottom than to the top, the amount of illumination distributed to the bottom vertices (4×5=20) is about 1.7 times the amount of illumination distributed to the top vertices (4×3=12).

In the present embodiment, the above process is then typically repeated to distribute material properties values of the object onto the vertices. In the present embodiment, the material properties include attenuation factors and scattering lengths for the material bounded by respective voxels, step 370. Because the attenuation factors and scattering lengths are parameters of the material within the object, and not just on the surface, the process is performed for all voxels that include a portion of the object. In this embodiment, as a result, the material properties are mapped onto vertices of the voxels as a volume-weighted scattering length grid, and a volume-weighted attenuation factoring grid.

At this stage, a number of grids may be allocated and populated, for example, one grid to store weighted diffuse illumination values, one grid to store weighted attenuation factors, and one grid to store weighted scattering lengths. In other embodiments, additional grids may be allocated to stored additional values. In still another embodiment, only a single grid may be defined, and the weighted diffuse illumination values and weighted material properties are merely associated with that grid.

In the present embodiment, the diffuse illumination values, attenuation factors, and scattering lengths are color dependent. In this example, diffuse illumination values include a red component, a green component, and a blue component, however other color system may also be used. In one embodiment, the attenuation factors and scattering lengths are color dependent. As an example, for a green jade material, the scattering lengths of red and blue may be shorter in the material than the scattering length of green in the material. Accordingly, in the present embodiment, nine volumetric grids may be created and populated. In other embodiments, a single grid having vertices associated with multiple values may also be used.

The following steps are performed to efficiently simulate a scattering process of the translucent material. In the present embodiment, the process begins by processing the area-weighted diffuse illumination grid values, the volume-weighted scattering length grid values, and the volume-weighted attenuation factor grid values with a short range dealiasing filter per color step 380. In embodiments of the present invention, the dealiasing filter may be a blur filter, or the like.

Next, in this embodiment, the area weighted diffuse illumination values, the volume-weighted scattering lengths, and volume-weighted attenuation factors are normalized, step 385. In one example, the area weighted diffuse illumination grid values are divided by a grid storing the areas of the respective voxels; and the volume-weighted scattering length grid values and the volume-weighted attenuation factor grid values are both divided by a grid storing the volumes of the respective voxels. In other embodiments, other types of normalizing filters may be used.

Next, the diffuse illumination values are determined by solving the elliptic radiative transfer equation on the grid values:

$$\mu \nabla^2 D = I - \alpha D$$

In this equation, $\mu$ is a local scattering coefficient; $\alpha$ is the local extinction coefficient, I is the source illumination from the surface, and D is the diffuse radiosity. In the present embodiment, $\mu$ and $\alpha$ (an extinction value) are derived from the attenuation factor grid values and the scattering length grid values; and I is derived from the diffuse illumination grid values. In this equation, $\alpha D$ represents the amount of illumination I absorbed, and $\mu \nabla^2 D$ represents the illumination flux.

In the present embodiment, the diffuse illumination values are determined by running a recursive low pass filter on the illumination grid values, step 390. In one embodiment, the recursive filter may be similar to the following equation:

$$Y(n) = I(n) + \alpha(n) Y(n-1)$$

In this equation, $Y(n)$ represents a diffuse illumination compensation value at point n; $I(n)$ represents the diffuse illumination value at point n; $\alpha(n)$ represents an extinction value at point n; and $Y(n-1)$ represents the diffuse illumination compensation value at point n-1. In this embodiment, $\alpha(n)$ (derived from the scattering length and absorption values) varies across the grid.

In this embodiment, the recursive low pass filter is run upon the illumination grid values in six directions, for example, +x, -x, +y, -y, +z, -z directions. By doing this, the illumination values are effectively spread within the material to approximate the Green's function of the scattering operator ($\mu \nabla^2$), while also compensating for material having different scattering lengths. In this embodiment, the values for $\alpha$ are selected to simulate Green's function. More particularly, both the recursive low pass filter and Green's functions are both exponential, thus $\alpha$ is selected such that the low pass filter has approximately the same decay characteristics of Green's function. In the present embodiment, the change is $\alpha$ for adjacent samples is assumed to be small compared to the value of $\alpha$.

In other embodiments, other numerical methods for determining the diffuse illumination grid are contemplated. For example, a fast elliptic solver such as a fast convolution FFT solver or a multi-grid solver can be applied using the illumination grid values and scattering grid values, described above. In light of the present disclosure, one of ordinary skill in the art will recognize that other methods for solving for the diffuse illumination values can be used.

In the present embodiment, a result of this process is a diffuse illumination grid where the vertices are populated with diffuse illumination compensation values resulting from the spreading of light within an object. More particularly, the diffuse illumination compensation values of surface voxels represent an amount of illumination to be added to the surface diffuse illumination values determined by the surface shader. For example, if an translucent object is thin and is back-lit, the surface shader may specify a low diffuse illumination value at surface. However, using the process described above, the total diffuse illumination value at the surface may be increased on account of the diffuse illumination compensation values determined above.

In the present example, the surface voxels determined above are again identified, and the diffuse illumination compensation values for vertices in the surface voxels are interpolated to determine diffuse illumination compensation factors for each surface sample, step 400. Any conventional interpolation process may be implemented. Next, the diffuse illumination compensation values are combined with the surface shading values (diffuse illumination values) determined by the shader, step 410. In embodiments of the present invention, the combination may be any linear or non-linear combination of the two values. In the present embodiment, the resulting surface illumination values represent the appearance of the object illuminated by lighting sources compensated for the object material.

Figure 5:
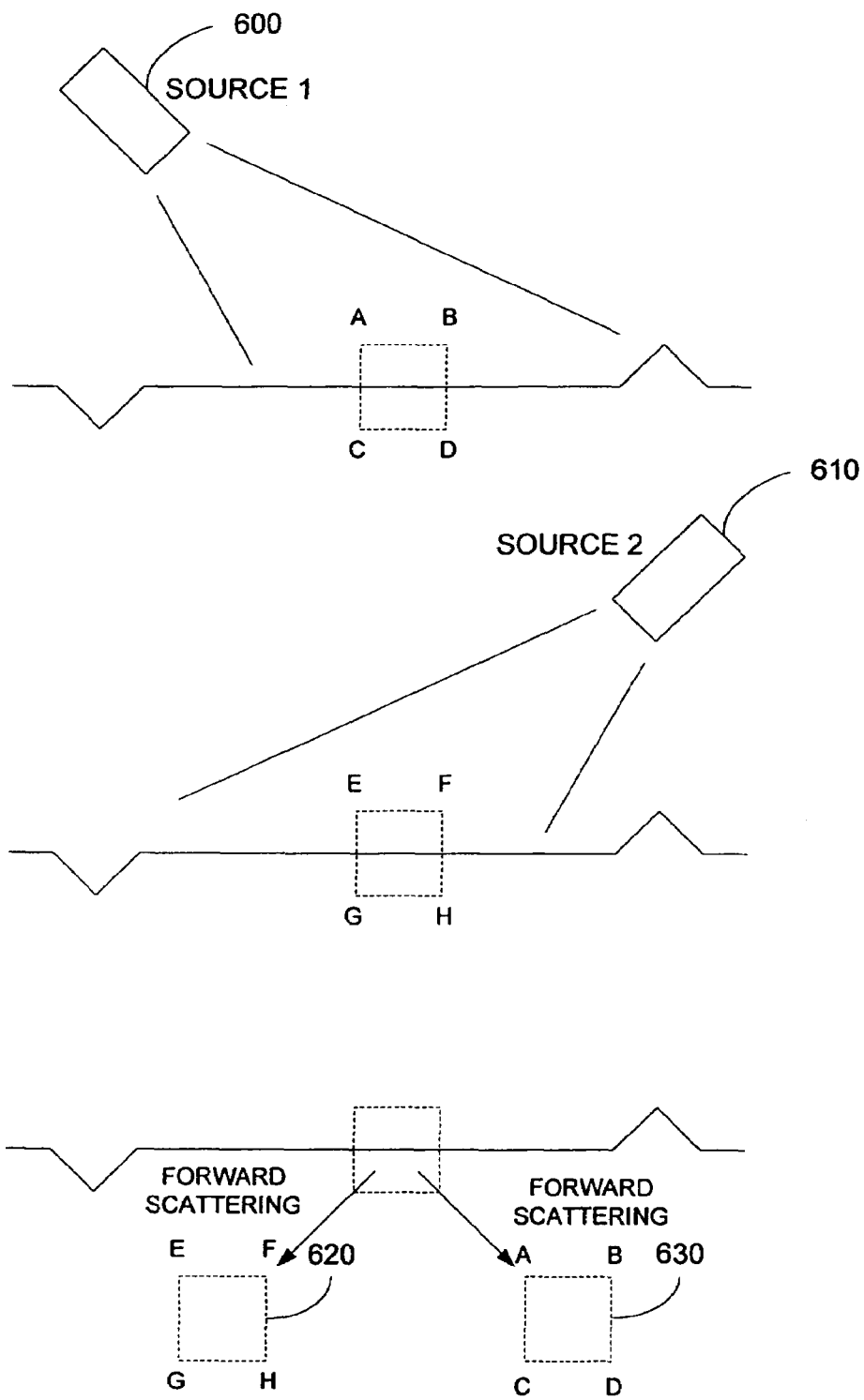
FIG. 5 illustrates another example of an embodiment of the present invention.

In the foregoing specification, the invention has been described with reference to specific exemplary embodiments thereof. Many changes or modifications are readily envisioned. For example, in one embodiment, illumination grids are formed and populated for each light source striking the object. To simulate initial forward scattering of the light on the object for each illumination source, the illumination grid values are offset into the object. For example, as illustrated in FIG. 5, the illumination values for each vertex due to the illumination sources 600 and 610 are moved inside the object, 620, 630. The amount of offset is estimated in light of the object material, for example, the more translucent an object is, the deeper the offset will be; and the more opaque a material is, the shallower the offset will be. After compensating for forward scattering for all light sources, the illumination grid values are combined before the determining the diffuse illumination compensation.

In embodiments of the present invention, the inventors have determined that advantages of the present schema may be applied to the shot rendering techniques described in the above-referenced application. Further, it is envisioned that a great number of shaders currently compatible with Render-Man® could be used in embodiments of the present invention.

Embodiments of the present invention may be applied to any number of rendering platforms and for a variety of purposes. For example, embodiments may be use on engineering workstations for development purposes, on visualization systems for artists and animators, in a rendering farm machine for final production, and the like. Accordingly, the concepts disclosed above are extremely valuable in a variety of applications.

In the above disclosure, any resolution for the grids may be used. The inventor has determined that it is advantageous that the grid be larger than the smallest shaded surface. Further, the grid may be much greater in size. In one embodiment, a typical voxel may include two shading surface values to nine shading surface values. In other embodiments, voxels may include a smaller number of shading surface values, e.g. 0.5 or greater, and voxels may include a larger number of shading surface values, e.g. ten to 25, 20 to 40, 30 or greater, and the like.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system comprises:
   receiving a plurality of diffuse illumination values for a plurality of surface positions of an object;
   determining a plurality of volumes associated with the object, wherein the plurality of volumes include the plurality of surface positions of the object;
   performing a plurality of directional low pass filtering operations within the plurality of volumes in response to the plurality of diffuse illumination values to determine a plurality of diffuse illumination compensation values for the plurality of surface positions; and
   determining compensated diffuse illumination values for the plurality of surface positions in response to the plurality of diffuse illumination values and in response to the plurality of diffuse illumination compensation values.

2. The method of claim 1 further comprising:
   determining a plurality of first color component diffuse illumination values in response to the plurality of diffuse illumination values;
   determining a plurality of second color component diffuse illumination values in response to the plurality of diffuse illumination values;
   wherein performing the plurality of directional low pass filtering operations comprises:
      performing a first plurality of directional low pass filtering operations within the plurality of volumes in response to the plurality of first color component diffuse illumination values to determine a plurality of first color component diffuse illumination compensation values for the plurality of surface positions; and
      performing a second plurality of directional low pass filtering operations within the plurality of volumes in response to the plurality of second color component diffuse illumination values to determine a plurality of second color component diffuse illumination compensation values for the plurality of surface positions.

3. The method of claim 2
   wherein the first plurality of directional low pass filtering operations are determined in response to a first plurality of extinction parameters associated with the plurality of volumes for the first color component; and
   wherein the second plurality of directional low pass filtering operations are determined in response to a second plurality of extinction parameters associated with the plurality of volumes for the second color component.

4. The method of claim 1
   wherein the plurality of directional low pass filtering operations are determined in response to a first plurality of extinction parameters associated with the plurality of volumes; and
   wherein extinction parameters from the first plurality of extinction parameters associated with volumes from the plurality of volumes are not uniform.

5. The method of claim 1 wherein the plurality of directional low pass filtering operations within the plurality of volumes comprises:
   a first directional low pass filtering operation in a first direction from surface positions for the plurality of surface positions into the object; and
   a second directional low pass filtering operation in a second direction, wherein the second direction is opposite the first direction.

6. The method of claim 1 wherein the plurality of directional low pass filtering operations within the plurality of volumes further comprises:
   a first lateral recursive low pass filtering operation in a first lateral direction; and
   a second lateral recursive low pass filtering operation in a second lateral direction, wherein the second lateral direction is orthogonal from the first lateral direction.

7. The method of claim 1 further comprising:
   determining surface shading values for the plurality of surface positions in response to the compensated diffuse illumination values for the plurality of surface positions;
   determining an output image in response the surface shading values; and
   storing a representation of the output image in a tangible media.

8. The method of claim 1
   wherein the plurality of volumes comprises a first plurality of voxels;
   wherein a second plurality of voxels from the first plurality of voxels bound the plurality of surface positions of the object; and
   wherein each voxel from the plurality of voxels bounds two or more surface positions from the plurality of surface positions.

9. The tangible media storing the representation of the output image formed according to the method of claim 7.

10. A computer system comprises:
   a memory configured to store a plurality of diffuse illumination values for a plurality of surface positions of an object; and
   a processor coupled to the memory, wherein the processor is configured to determine a plurality of volumes associated with the object, wherein the plurality of volumes include the plurality of surface positions of the object, wherein the processor is configured to perform a plurality of directional low pass filtering operations within the plurality of volumes in response to the plurality of diffuse illumination values to determine a plurality of diffuse illumination compensation values for the plurality of surface positions, and wherein the processor is configured to determine compensated diffuse illumination values for the plurality of surface positions in response to the plurality of diffuse illumination values and in response to the plurality of diffuse illumination compensation values.

11. The computer system of claim 10
wherein the processor further is configured to determine a plurality of first color component diffuse illumination values in response to the plurality of diffuse illumination values;
wherein the processor is configured to determine a plurality of second color component diffuse illumination values in response to the plurality of diffuse illumination values; and
wherein the processor is configured to perform the plurality of directional low pass filtering operations by being configured to perform a first plurality of directional low pass filtering operations within the plurality of volumes in response to the plurality of first color component diffuse illumination values to determine a plurality of first color component diffuse illumination compensation values for the plurality of surface positions, and by being configured to perform a second plurality of directional low pass filtering operations within the plurality of volumes in response to the plurality of second color component diffuse illumination values to determine a plurality of second color component diffuse illumination compensation values for the plurality of surface positions.

12. The computer system of claim 11
wherein a first plurality of extinction parameters are associated with the plurality of volumes for the first color component; and
wherein a second plurality of extinction parameters are associated with the plurality of volumes for the second color component.

13. The computer system of claim 10
wherein the processor is configured to perform the plurality of directional low pass filtering operations within the plurality of volumes in response to the plurality of diffuse illumination values and in response to a first plurality of extinction parameters associated with the plurality of volumes; and
wherein extinction parameters from the first plurality of extinction parameters are not uniform.

14. The computer system of claim 10 wherein the plurality of directional low pass filtering operations within the plurality of volumes comprises:
a first directional low pass filtering operation in a first direction from surface positions for the plurality of surface positions into the object; and
a second directional low pass filtering operation in a second direction, wherein the second direction is opposite the first direction.

15. The computer system of claim 10 wherein the plurality of directional low pass filtering operations within the plurality of volumes further comprises:
a first lateral recursive low pass filtering operation in a first lateral direction relative to a surface position from the plurality of surface potions; and
a second lateral recursive low pass filtering operation in a second lateral direction relative to the surface position from the plurality of surface potions, wherein the second lateral direction is orthogonal from the first lateral direction.

16. The computer system of claim 10 wherein the processor is also configured to determine surface shading values for the plurality of surface positions in response to the compensated diffuse illumination values for the plurality of surface positions, configured to determine an output image in response the surface shading values, and configured to store a representation of the output image in a tangible media.

17. The computer system of claim 10
wherein the processor is configured to perform a plurality of directional low pass filtering operations within the plurality of volumes by being configured to associate diffuse illumination values from the plurality of diffuse illumination values to a set of volumes from the plurality of volumes, by being configured to perform a first directional low pass filtering operation in a first direction from the set of volumes, and by being configured to perform a second directional low pass filtering operation in a second direction, wherein the second direction is opposite the first direction.

18. The computer system of claim 17
wherein the processor is configured to perform a plurality of directional low pass filtering operations within the plurality of volumes by also being configured to perform a third directional low pass filtering operation in a third direction orthogonal to the first direction, and by being configured to perform a fourth directional low pass filtering operation in a fourth direction orthogonal to the first direction.

19. A computer program product, stored on a tangible media, for a computer system including a processor includes:
code that directs a processor to receive a plurality of diffuse illumination values for a plurality of surface positions of an object;
code that directs a processor to determine a plurality of volumes associated with the object, wherein the plurality of volumes include the plurality of surface positions of the object;
code that directs a processor to perform a plurality of directional low pass filtering operations within the plurality of volumes in response to the plurality of diffuse illumination values to determine a plurality of diffuse illumination compensation values for the plurality of surface positions; and
code that directs a processor to determine compensated diffuse illumination values for the plurality of surface positions in response to the plurality of diffuse illumination values and in response to the plurality of diffuse illumination compensation values;
wherein the codes reside on a tangible media.

20. The computer program product of claim 19 wherein the tangible media also includes:
code that directs a processor to determine a plurality of first color component diffuse illumination values in response to the plurality of diffuse illumination values;
code that directs a processor to determine a plurality of second color component diffuse illumination values in response to the plurality of diffuse illumination values;
code that directs a processor to perform a first plurality of directional low pass filtering operations within the plurality of volumes in response to the plurality of first color component diffuse illumination values to determine a plurality of first color component diffuse illumination compensation values for the plurality of surface positions; and code that directs a processor to perform a second plurality of directional low pass filtering operations within the plurality of volumes in response to the plurality of second color component diffuse illumination values to determine a plurality of second color component diffuse illumination compensation values for the plurality of surface positions.

21. The computer program product of claim 20
wherein the first plurality of directional low pass filtering operations are determined in response to a first plurality of extinction parameters associated with the plurality of volumes for the first color component; and wherein the second plurality of directional low pass filtering operations are determined in response to a second plurality of extinction parameters associated with the plurality of volumes for the second color component;

wherein the first plurality of extinction parameters is different from the second plurality of extinction parameters.

22. The computer program product of claim 19
wherein the plurality of directional low pass filtering operations are determined in response to a first plurality of extinction parameters associated with the plurality of volumes; and wherein extinction parameters from the first plurality of extinction parameters associated with volumes from the plurality of volumes are not uniform.

23. The computer program product of claim 19 wherein the code that directs a processor to perform the first plurality of directional low pass filtering operations comprises:

code that directs a processor to perform a first directional low pass filtering operation in a first direction from surface positions for the plurality of surface positions into the object; and code that directs a processor to a second directional low pass filtering operation in a second direction, wherein the second direction is opposite the first direction.

24. The computer program product of claim 19 wherein the code that directs a processor to perform the first plurality of directional low pass filtering operations comprises:

code that directs a processor to perform a first lateral recursive low pass filtering operation in a first lateral direction; and code that directs a processor to perform a second lateral recursive low pass filtering operation in a second lateral direction, wherein the second lateral direction is orthogonal from the first lateral direction.

25. The computer program product of claim 19 wherein the tangible media includes:

code that directs a processor to determine surface shading values for the plurality of surface positions in response to the compensated diffuse illumination values for the plurality of surface positions;

code that directs a processor to determine an output image in response the surface shading values; and code that directs a processor to store a representation of the output image in a tangible media.

* * * * *